United States Patent [19]

Richter et al.

[11] Patent Number: 5,290,590
[45] Date of Patent: Mar. 1, 1994

[54] PRODUCTION OF MAGNETIC RECORDING MEDIUM

[75] Inventors: Hans J. Richter, St. Martin; Hartmut Hibst, Schriesheim; Gerd Fischer, Ludwigshafen, all of Fed. Rep. of Germany

[73] Assignee: BASF Aktiengesellschaft, Ludwigshafen, Fed. Rep. of Germany

[21] Appl. No.: 822,259

[22] Filed: Jan. 17, 1992

[30] Foreign Application Priority Data

Jan. 21, 1991 [DE] Fed. Rep. of Germany ....... 4101195

[51] Int. Cl.$^5$ ................................................ B05D 5/12
[52] U.S. Cl. ................................. 427/128; 427/255.5
[58] Field of Search .............................. 427/128–132, 427/48, 255.5; 428/694, 695, 900

[56] References Cited

U.S. PATENT DOCUMENTS

| | | | |
|---|---|---|---|
| 4,601,912 | 7/1986 | Arai et al. | 427/35 |
| 4,622,271 | 11/1986 | Arai et al. | 428/615 |
| 4,652,460 | 3/1987 | Shirahata et al. | 427/39 |
| 4,702,938 | 10/1987 | Yasunaga et al. | 427/132 |
| 4,713,262 | 12/1987 | Yasunaga et al. | 427/130 |
| 4,741,922 | 5/1988 | Wales | 427/130 |
| 4,766,034 | 8/1988 | Sato et al. | 428/336 |
| 4,801,500 | 1/1989 | Yasunaga et al. | 428/336 |

*Primary Examiner*—Bernard Pianalto
*Attorney, Agent, or Firm*—Keil & Weinkauf

[57] ABSTRACT

A magnetic recording medium, consisting essentially of a polymeric, web-like substrate and a coherent thin layer of a ferromagnetic material is produced in a reduced-pressure chamber by depositing a vapor jet of the ferromagnetic material onto the moving substrate surface which is fed on a cylindrical drum.

1 Claim, 1 Drawing Sheet

PRODUCTION OF MAGNETIC RECORDING MEDIUM

The present invention relates to a process for the production of a magnetic recording medium, consisting essentially of a polymeric, web-like substrate and a coherent thin layer of a ferromagnetic material, in a chamber under reduced pressure, by depositing a vapor jet of the ferromagnetic material on the moving substrate surface which is fed over a cylindrical drum.

Magnetic recording media whose magnetic layer consists of a coherent, thin ferromagnetic metal layer are well known. They are usually produced by a method in which, in a chamber under reduced pressure, the ferromagnetic material is vaporized in an evaporator unit and the resulting vapor jet is deposited on the moving surface of a polymeric substrate which is fed over a cooled cylindrical drum. To generate a preferred magnetic direction in the magnetic layer, the vapor jet is positioned and deposited obliquely with respect to the plane of the substrate. The angles of vapor deposition can be adjusted by covering parts of the vapor jet by shutters. Furthermore, the evaporator source can be arranged in such a way that it is not located in the vertical projection with respect to the guide axis of the drum but displaced toward the vertical projection of the generating line of the drum.

Recording media produced in this way are particularly suitable for recording information with high storage density, as occurs, for example, at the high frequencies of modern video recording systems. In such video applications which operate according to the Helicae scan principle, the head moves at an angle of, in general, from 3° to 10° relative to the running direction of the tape. Moreover, depending on the recording system, the air gap of the head is additionally inclined with respect to the recording direction by an angle which may be 10°, for example in the Hi8 system. The recorded tracks are inclined, for example by about 15°, with respect to the running direction of the tape and hence to the projection of the preferred magnetic direction in the film plane. This deviation from the preferred magnetic direction of the magnetic recording medium means a loss of residual induction available for playback.

It is an object of the present invention to provide a process for the production of magnetic recording media of the thin metal layer type, which process does not have the disadvantage described. It is a particular object of the present invention to obtain a magnetic recording medium of the thin metal layer type in which the projection of the preferred magnetic direction onto the plane of the tape coincides with the average recording direction.

We have found that this object is achieved by a process for the production of magnetic recording media, consisting essentially of a polymeric substrate and a coherent thin layer of a ferromagnetic material, in a chamber under reduced pressure, by producing a vapor jet of the ferromagnetic material from an evaporator unit provided with such material, and depositing the vapor jet on the substrate which is fed over a cylindrical drum, in particular a cooled cylindrical drum the vapor jet striking the substrate at an angle which differs from 90°, if the center of the evaporator unit is laterally displaced in the axial direction of the drum, with respect to the center of the substrate surface to be coated by vapor deposition.

The materials suitable for the formation of thin ferromagnetic layers are known. They are the metals Co, Ni and Fe, applied as thin layers, and alloys thereof, as well as thin layers which contain one or more further elements, even if in small amounts, e.g. chromium. The presence of oxygen helps in particular to improve the magnetic, chemical and mechanical properties of these layers, especially if oxygen is fed in during the vapor deposition process.

The procedure for the novel process is described by way of example with reference to FIGS. 1 and 2.

DETAILED DESCRIPTION OF THE DRAWINGS

Figure 1:
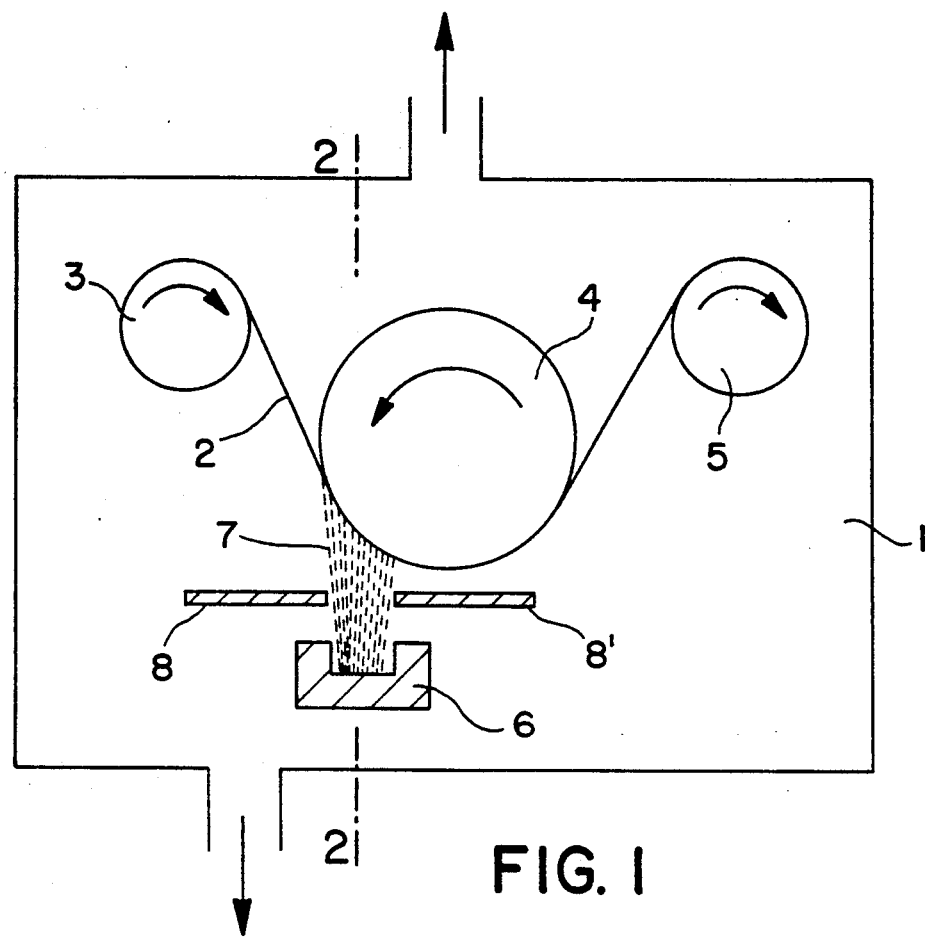
FIG. 1 shows the diagram of a vapor deposition means.
Figure 2:
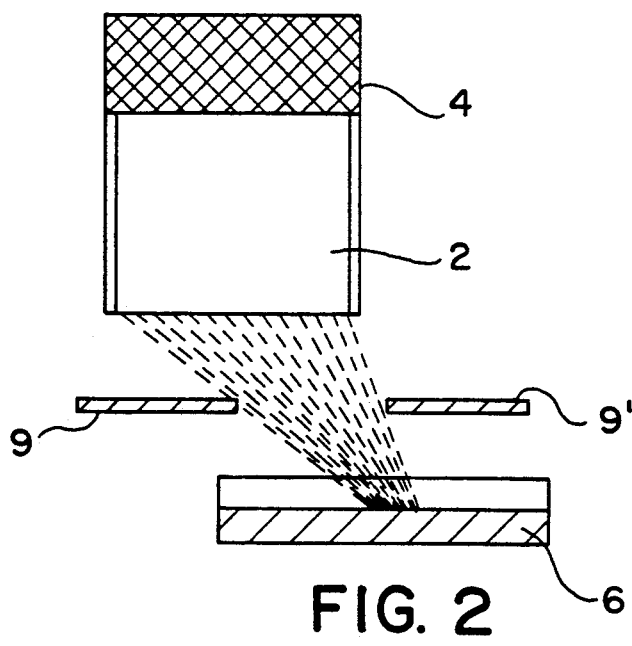
FIG. 2 shows the side view of the vapor deposition means according to FIG. 1, along the section A—A'.

FIG. 1 shows a conventional vapor deposition means, consisting of the reduced-pressure chamber 1 in which the polymeric substrate 2, in the form of a film web, is fed from the storage reel 3 over the cooled cylindrical drum 4 to the winding reel 5. The evaporator unit 6 containing the ferromagnetic material whose vapor jet 7, due to the shutters 8 and 8', strikes the film web at angles differing from 90° and condenses on the substrate. In the novel process, the evaporator unit 6 is laterally displaced in the axial direction of the cooled drum with respect to the center of the film web 2 to be coated by vapor deposition, as shown in FIG. 2, a section along the line A—A' of FIG. 1. For the purposes of the present invention, it has furthermore been found advantageous if the vapor jet 7 is additionally oriented by the shutters 9 and 9'. The displacement of the evaporator unit and the cutting out of the vapor jet, as shown in FIG. 2, are chosen so that the average angle of incidence virtually corresponds to the average recording angle intended for the magnetic recording material.

The novel process makes it possible to produce magnetic recording media, in particular those for video recording by the Helican scan principle, in which the projection of the preferred magnetic direction in the plane of the tape coincides with the average recording direction.

We claim:

1. In a process for the production of a magnetic recording medium, consisting essentially of a polymeric substrate and a coherent thin layer of a ferromagnetic material, in a reduced-pressure chamber by producing a vapor jet of the ferromagnetic material from an evaporator unit provided with such material, and depositing the vapor jet on the substrate which is fed over a cylindrical drum, the vapor jet striking the substrate at angles which differ from 90°, the improvement comprising the center of the evaporator unit is laterally displaced in the axial direction of the drum, with respect to the center of the substrate surface to be coated by vapor deposition.

* * * * *